United States Patent
Dwivedi et al.

(10) Patent No.: US 11,329,746 B2
(45) Date of Patent: May 10, 2022

(54) METHOD AND A FIRST DEVICE FOR CLOCK SYNCHRONIZATION

(71) Applicant: Telefonaktiebolaget LM Ericsson (publ), Stockholm (SE)

(72) Inventors: Satyam Dwivedi, Solna (SE); Fredrik Gunnarsson, Linköping (SE); Bo Hagerman, Jersey City, NJ (US); Avneesh Vyas, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 10 days.

(21) Appl. No.: 16/979,903

(22) PCT Filed: Mar. 14, 2018

(86) PCT No.: PCT/SE2018/050244
§ 371 (c)(1),
(2) Date: Sep. 11, 2020

(87) PCT Pub. No.: WO2019/177503
PCT Pub. Date: Sep. 19, 2019

(65) Prior Publication Data
US 2021/0058181 A1    Feb. 25, 2021

(51) Int. Cl.
*H04J 3/06*    (2006.01)
(52) U.S. Cl.
CPC .......... *H04J 3/0667* (2013.01); *H04J 3/0676* (2013.01)
(58) Field of Classification Search
CPC ............ H04J 3/062; H04J 3/06; H04J 3/0638; H04J 3/0676; H04J 3/0667
See application file for complete search history.

(56) References Cited

U.S. PATENT DOCUMENTS

| 9,236,967 B1 | 1/2016 | Mustiere et al. |
| 2010/0040369 A1 | 2/2010 | Zhao et al. |

(Continued)

FOREIGN PATENT DOCUMENTS

| EP | 2919400 A1 | 9/2015 |
| WO | 2013167977 A1 | 11/2013 |

(Continued)

OTHER PUBLICATIONS

Dwivedi et al "Joint Ranging and Clock Parameter Estimation by Wireless Round Trip Time Measurements", IEEE 2015 (Year: 2015).*

(Continued)

*Primary Examiner* — Omer S Mian
(74) *Attorney, Agent, or Firm* — Christopher & Weisberg, P.A.

(57) ABSTRACT

A method and a first device (110A) for synchronizing a first clock in the first device (110A) with a second clock in a second device (110B). The first device (110A) estimates 5 (A430) a relative clock phase offset, based on a sequence of round trip times, RTTs, of precision time protocol, PTP, messages which are exchanged between the first and second devices (110A, 110B). The estimated relative clock phase offset is a time difference between a time of arrival of a first arrived PTP message among the PTP messages and a direct subsequent clock cycle. The first device (110A) further determines 10 (A450) a clock value of the first clock, based on the estimated relative clock phase offset, to synchronize the first clock with the second clock.

6 Claims, 4 Drawing Sheets

(56) References Cited

U.S. PATENT DOCUMENTS

| | | | |
|---|---|---|---|
| 2010/0085989 A1 | 4/2010 | Belhadj et al. | |
| 2010/0293243 A1 | 11/2010 | Wittwer | |
| 2016/0330012 A1 | 11/2016 | Liu | |
| 2017/0180108 A1 | 6/2017 | D'Eletto | |
| 2018/0152281 A1* | 5/2018 | Zigelboim | H04L 43/106 |
| 2019/0207695 A1* | 7/2019 | Aweya | H04J 3/0667 |

FOREIGN PATENT DOCUMENTS

| | | |
|---|---|---|
| WO | 2015049478 A1 | 4/2015 |
| WO | 2016181198 A1 | 11/2016 |

OTHER PUBLICATIONS

Dwivedi, Satyam, et al., "Joint Ranging and Clock Parameter Estimation by Wireless Round Trip Time Measurements", IEEE Journal on Selected Areas in Communications, vol. 33, No. 11, Nov. 2015, 2379-2390.

ITU, "ITU-T G.8261/Y.1361", Timing and synchronization aspects in packet networks, Aug. 2013, 1-116.

ITU, "ITU-T G.8264/Y.1364", Distribution of timing information through packet networks, Aug. 2017, 1-42.

ITU, "ITU-T G.8265.1/Y.1365.1", Precision time protocol telecom profile for frequency synchronization, Jul. 2014, 1-32.

ITU, "ITU-T G.8275.1/Y.1369 1", Internet protocol aspects—Transport Precision time protocol telecom profile for phase/time synchronization with full timing support from the network, Jun. 2016, 1-56.

Lipinski, Maciej, et al., "White Rabbit: a PTP Application for Robust Sub-nanosecond Synchronization", 2011 IEEE International Symposium on Precision Clock Synchronization for Measurement, Control and Communication, Sep. 2011, 1-6.

EPO Communication and Supplementary European Search Report dated May 19, 2021 for Patent Application No. 18910123.1, consisting of 4-pages.

\* cited by examiner

METHOD AND A FIRST DEVICE FOR CLOCK SYNCHRONIZATION

TECHNICAL FIELD

Embodiments herein relate to a method and a first device for synchronizing a first clock in the first device with a second clock in a second device.

BACKGROUND

Clock synchronization in communication networks enables many services including assisted navigation, location, and emergency calls. Moreover, synchronization between entities in a wireless or cellular network is fundamental, otherwise they would not even work. For instance, base stations frequently need to determine the distance to mobile terminals operating in their cells and in neighbouring cells. The base stations and mobile terminals have to precisely follow transmission time-slots. Keeping synchronization between the base stations and the mobile terminals is therefore vital.

Precision Time Protocol (PTP) is a protocol used to synchronize clocks throughout a communication network. On a local area network, a clock accuracy in the sub-microsecond range is typically required and achieved, for measurement and control systems. The PTP was defined in the IEEE 1588 standard that describes a master-slave architecture for timing distribution across a network. In general, the terminology of slave and master as used herein implies that a slave device adjusts its clock to be synchronized with a clock in a master device.

Figure 1:
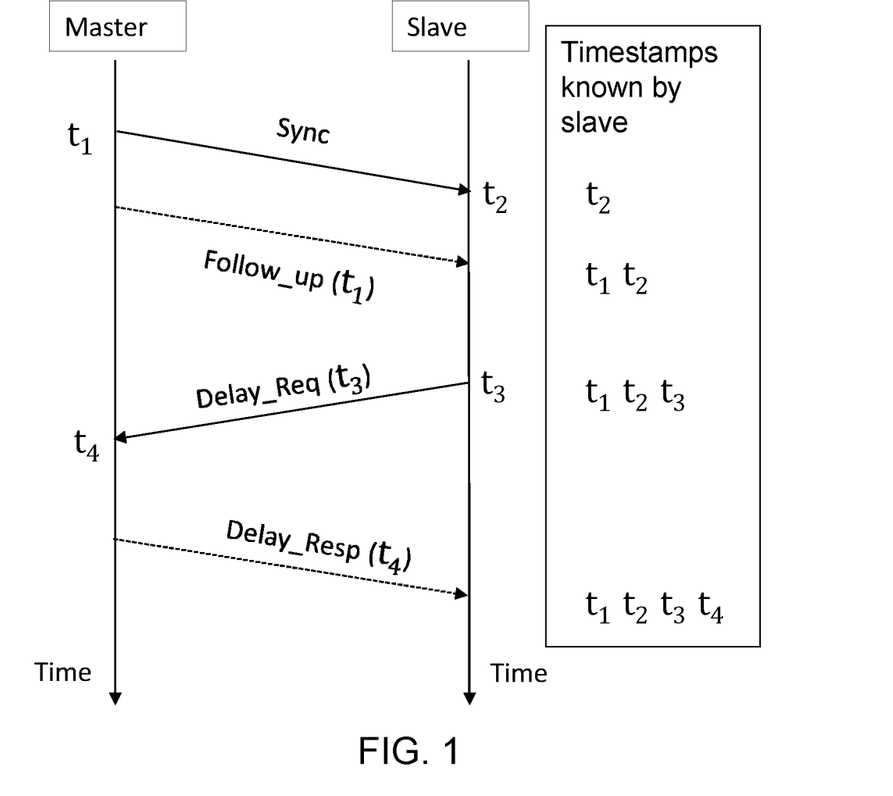
FIG. 1 is a schematic overview of an exemplary PTP in which embodiments herein may be implemented.

FIG. 1 shows an example of how various PTP messages are communicated between a master device and a slave device. As an example, the master and slave devices may be a base station and a mobile terminal, respectively. Messages used in PTP between the master and slave devices comprise: Sync, Follow up (Follow_up), Delay request (Delay_Req) and Delay response (Delay_Resp). The PTP messages may be transported by using an Ethernet, a Synchronous Ethernet (SyncE) or a User Datagram Protocol over Internet Protocol (UDP/IP).

The master device may periodically broadcast its current time as a message to the other nodes in the domain, in this description called slave devices. Each broadcast procedure begins at time $t_1$ with a Sync message sent by the master device. The slave device receiving this Sync message takes note of the local time $t_2$ when this message is received. The master may subsequently send a Follow_Up message with an accurate timestamp for $t_1$. Not all master devices have the ability to present an accurate timestamp in the Sync message. It is only after the transmission is complete that such master devices are able to retrieve an accurate timestamp for the Sync transmission from their network hardware. Masters with this limitation therefore need to use the Follow_Up message to convey the timestamp $t_1$. Some other masters with PTP capabilities built into their network hardware are able to present the accurate timestamp $t_1$ in the Sync message and do not need to send the Follow_Up message.

In order to accurately synchronize to the master clock in the master device, the slave device itself determines a transit time d of the Sync messages. The slave device can determine the transit time d, which may also be referred to as a propagation time, indirectly by measuring a round-trip time (RTT) from its own clock to a master clock in the master device. The slave device sends a Delay_Req message at time $t_3$ to the master device. The master device receives and timestamps the Delay_Req at time $t_4$ and responds with a Delay_Resp message. The master device includes the timestamp for $t_4$ in the Delay_Resp message.

Through these message exchanges the slave device learns the timestamps for $t_2$, $t_3$, $t_4$.

An average transit time d for the above messages, which is also referred to as mean path delay m.p.d., is calculated as:

$$\text{m.p.d.} = ((t_2-t_1)+(t_4-t_3))/2$$

In currently used procedures for synchronization, the slave uses the master-slave clock differences to estimate a relative clock skew $\alpha$ and an initial clock phase offset $\beta$.

For instance, the initial clock phase offset $\beta$, sometimes also referred to as clock offset, is a constant offset between the master and slave clocks. It refers to a time difference between the master and slave clocks minus the mean path delay, and this initial clock phase offset can be, e.g., calculated as follows:

$$\beta = (t_2-t_1) - \text{m.p.d. or}$$

$$\beta = ((t_2-t_1)-(t_4-t_3))/2$$

Figure 2:
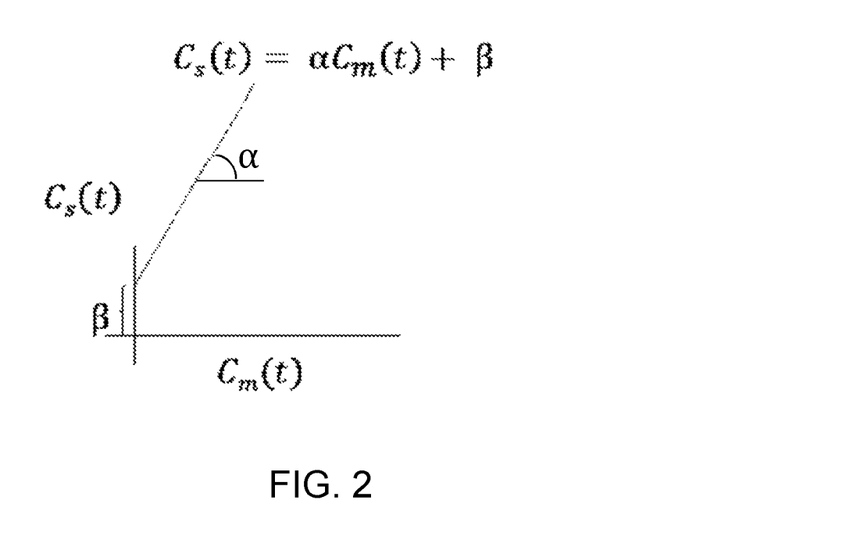
FIG. 2 illustrates an estimation of a slave clock according to conventional PTP.

The relative clock skew $\alpha$ corresponds to a slope or rate of change of the master-slave clock difference as show in FIG. 2.

Given $C_m(t)$, $\alpha$ and $\beta$, the slave will estimate its own clock value $C_s(t)$ at the time t. As shown in FIG. 2, a slave clock may be synchronized to the master clock as follows:

$$C_s(t) = \alpha C_m(t) + \beta$$

Where $C_S(t)$ denotes the slave clock value at a time t, $C_m(t)$ denotes master clock value at time the t, $\alpha$ represents the relative clock frequency skew and $\beta$ represents the initial clock phase offset between the master and slave clocks.

However using the current PTP may have various technical problems, e.g.:

The limited granularity of timestamps carried in PTP messages constrains the precision of the synchronization.

The current PTP cannot provide a precise synchronization for some applications, such as, wireless positioning and ranging systems, distributed antennas and military applications, which normally require sub-nanosecond synchronization precision.

SUMMARY

It is therefore an object of embodiments herein to improve the precision of clock synchronization between two devices, so as to reduce or eliminate clock asynchronization.

According to one aspect, the object is achieved by a method performed by a first device for synchronizing a first clock in the first device with a second clock in a second device. The method comprises estimating a relative clock phase offset, based on a sequence of round trip times, RTTs, of precision time protocol, PTP, messages which are exchanged between the first and second devices. The estimated relative clock phase offset is a time difference between a time of arrival of a first arrived PTP message among the PTP messages and a direct subsequent clock cycle. The method further comprises determining a clock value of the first clock, based on the estimated relative clock phase offset, to synchronize the first clock with the second clock.

According to another aspect, the object is achieved by a first device for synchronizing a first clock in the first device with a second clock in a second device. The first device is configured to estimate a relative clock phase offset, based on a sequence of round trip times, RTTs, of precision time protocol, PTP, messages which are exchanged between the first and second devices. The estimated relative clock phase offset is a time difference between a time of arrival of a first arrived PTP message among the PTP messages and a direct subsequent clock cycle. The first device is further configured to determine a clock value of the first clock, based on the estimated relative clock phase offset, to synchronize the first clock with the second clock.

According to another aspect, a computer program comprises instructions, which when executed by a first device, cause the first device to perform the above method.

According to another aspect, a carrier comprises the above computer program.

An advantage of embodiments herein is that, since the embodiments are implemented based on the conventional PTP messages, no additional overhead is required for the clock synchronization. The embodiments are therefore compatible to existing PTP. The embodiments can be applied in principle for all scenarios which make use of PTP for time and frequency synchronization.

By taking the relative clock phase offset in to account, which is a time difference between a time of arrival of a first arrived PTP message among the PTP messages and a direct subsequent clock cycle, a more precise synchronization of the first device to the second device is enabled.

Comparing to the conventional PTP, an additional measurement, e.g., the relative clock phase offset, is estimated based on the PTP messages. Particularly, the relative clock phase offset estimated based on the RTTs, instead of the timestamps carried in the PTP messages. Therefore a precision of the synchronization is not constrained by the limited granularity of timestamps. The embodiments can be used for some applications, such as, wireless positioning and ranging systems, distributed antennas and several military applications, requiring a precise synchronization.

BRIEF DESCRIPTION OF THE DRAWINGS

Examples of embodiments herein are described in more detail with reference to attached drawings in which.

DETAILED DESCRIPTION

The embodiments herein can be used to achieve a more precise synchronization based on the existing PTP messages. Without changing the existing PTP, the embodiments herein may be used to provide estimates of individual clock parameters, independent from the PTP timestamps. Examples of clock parameters may comprise the relative clock phase offset and/or a clock frequency skew ratio. The relative clock phase offset is not available in the existing PTP or other timestamp based synchronization techniques to estimate the relative clock phase offset.

The embodiments herein measure RTT of PTP messages to synchronize any two clocks. The procedure for time synchronization proposed in this description is superior in performance to the existing procedures for time synchronization.

The embodiments herein are implementable on both hardware and software. When being implemented as a software, the embodiments herein are compatible to existing PTP hardware without any need for hardware upgrades.

Figure 3:
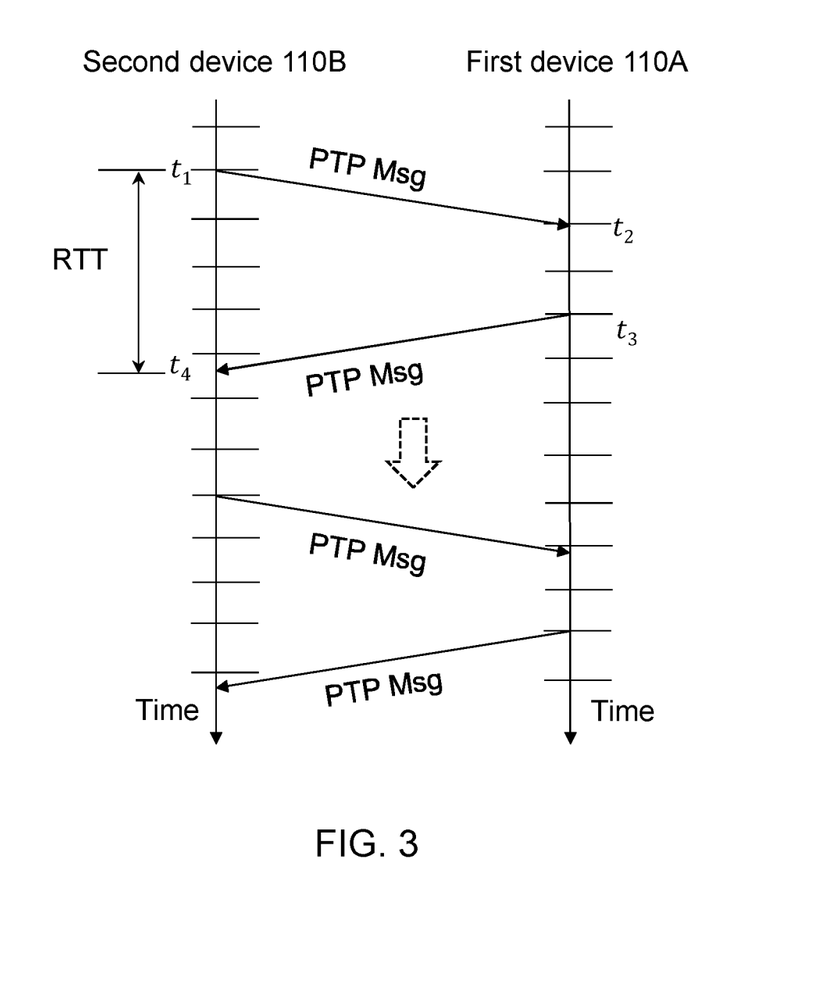
FIG. 3 illustrates an estimation of a RTT between two devices according to embodiments herein.

FIG. 3 depicts an example of how PTP messages can be exchanged between a first device 110A and a second device 110B according to embodiments herein.

The PTP messages in this example may be any conventional PTP messages such as those mentioned above. The PTP messages can be initiated by any one of the first and second devices 110A, 110B. Normally, the device initiating the PTP messages is called a PTP master device, a master device, or a master, and the other device is called a PTP slave device, a slave device or a slave.

The embodiments herein may be applied to a radio communication, although this is not a limitation. In other words, the first and second devices 110A, 110B may use a radio communication technique to communicate with each other. For instance, the first device 110A may be a wireless device, and the second device 110B may be a network node, or vice versa. Alternatively, both the first and second devices 110A, 110B may be network nodes. As a further example, the first and second devices 110A, 110B may be two wireless devices or two Internet of Things (IoT) devices.

The network node operating in a communication network may use any radio, cellular or wireless communication technology to communicate with the wireless device, such as LTE, e.g., LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA TDD), Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs), e.g., Multi-Standard Radio (MSR) base stations, multi-RAT base stations etc., any 3rd Generation Partnership Project (3GPP) cellular network, W-Fi networks, Worldwide Interoperability for Microwave Access (WiMAX), 5 Generation (5G) or New Radio (NR) system or any cellular network or system. Radio communications use ElectroMagnetic (EM) waves that travel through the air.

The term network node refers to equipment capable, configured, arranged and/or operable to communicate directly or indirectly with the wireless device and/or with other network nodes or equipment in the radio communication network to enable and/or provide wireless access to the wireless device and/or to perform other functions e.g., administration in the wireless network. Examples of network nodes include, but are not limited to, access points APs e.g., radio access points, base stations (BSs), e.g., radio base stations, Node Bs, evolved Node Bs (eNBs) and new radio (NR) NodeBs gNBs. Base stations may be categorized based on the amount of coverage they provide or, stated differently, their transmit power level and may then also be referred to as femto base stations, pico base stations, micro base stations, or macro base stations. A base station may be a relay node or a relay donor node controlling a relay. A network node may also include one or more or all parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes e.g., MSCs, MMEs, O&M nodes, OSS nodes, SON nodes, positioning nodes e.g., E-SMLCs, and/or MDTs. As another example, a network node may be a virtual network node as described in more detail below. More generally, however, network nodes may represent any suitable device or group of devices capable, configured, arranged, and/or operable to enable and/or provide a wireless device with access to the wireless network or to provide some service to a wireless device that has accessed the wireless network. Unless otherwise noted, the term network node may be used interchangeably herein with base station.

As used herein, the term wireless device refers to a device capable, configured, arranged and/or operable to use any one of the different RATs to communicate wirelessly with the network node and/or with other wireless devices. The wireless device is served by the network node using a RAT. Communicating wirelessly may involve transmitting and/or receiving wireless signals using electromagnetic waves, radio waves, infrared waves, and/or other types of signals suitable for conveying information through air.

The IoT device may be physical devices, vehicles, home appliances and other items embedded with electronics, software, sensors, actuators, and connectivity which enable these objects to connect and exchange data.

The embodiments herein may also be applied to wired communication, e.g., a computer network. The wired communication may also be called a packet-switched network, or packet network, e.g. an Ethernet, a Synchronous Ethernet (SyncE) or an IP network. The first and second devices 110A, 110B may refer to two devices operable to perform packet switching. For instance, the first and second devices 110A, 110B may be any one of a router, a switch, a mobile switch, a computer, a radio base station connected via wired or wireless connection.

It is assumed that the devices described herein have a hardware based clock that counts oscillations of a crystal. This type of hardware clock is used by the device's software clock to track the current time. Ideally, each device in a network is supposed to use the same clock reference. It means that two clocks in two devices are synchronized by having the same phase and frequency. In practice, different clocks are often used which are not completely synchronized due to either a different phase or a different frequency, which is called clock asynchronization. For instance, the hardware clock may be subject to drift, i.e., the clock's frequency varies and the time becomes inaccurate. As a result, any two clocks and the times they indicate are likely to be slightly different at any given time. The difference between two clocks in terms of indicated time is called their skew or clock skew.

Figure 4A:
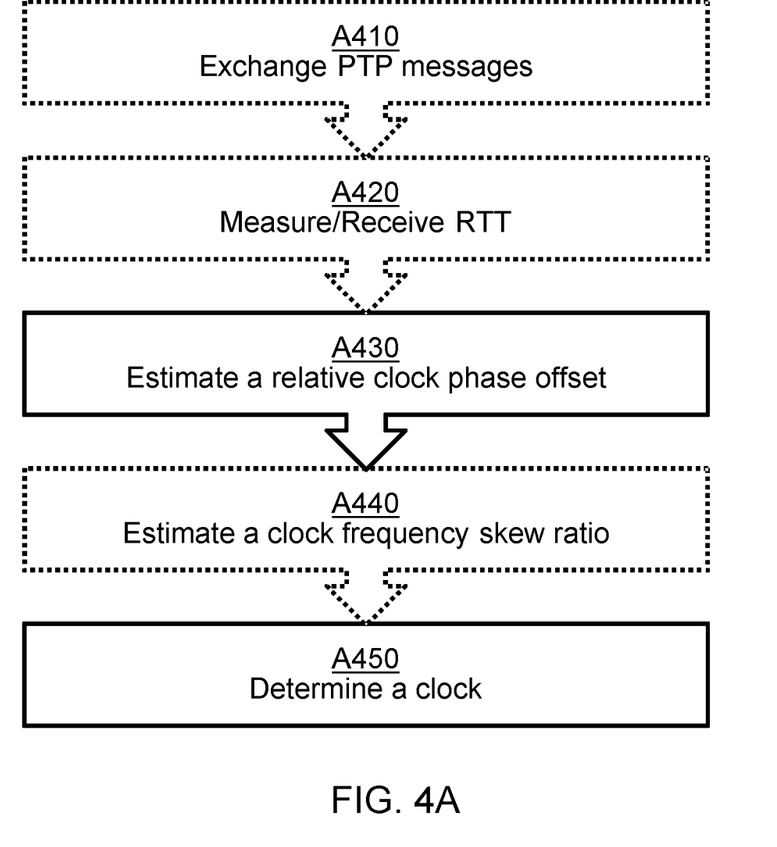
FIGS. 4A-4B are flowcharts depicting actions that may be performed by a first device according to embodiments herein.

Some actions performed by the first device 110A for synchronizing a first clock in the first device 110A with a second clock in a second device 110B will now be described with reference to FIG. 4A. Though normally it is the slave device that synchronizes its clock with the clock in the master device, however sometimes the synchronization is also performed in dual-direction, i.e. the master synchronizes its clock to the clock in the slave. Therefore the first device 110A may be either a slave, or a master.

The first device 110A may perform the following actions, which actions may be taken in any suitable order.

Action A410

The first device 110A exchanges PTP messages with the second device 110B, e.g. according to the conventional PTP protocol. The PTP messages may be any conventional PTP messages mentioned in above.

Action A420

The first device 110A measures, at a time point of measuring, a sequence of round trip times (RTTs) of the PTP messages, when the first device 110A is the slave.

Alternatively, when being the master the first device 110A receives the measured sequence of RTTs of the PTP messages from the second device 110B. For instance, the first device 110A receives the sequence of RTTs via either the Delay request (Delay_Req) or Delay response (Delay_Resp) messages. In this case, the sequence of RTTs may be carried in any suitable field of these two messages.

A RTT is generally a time duration between sending a message and receiving a response to said message. Measuring a RTT may also be referred to as calculating a RTT. As mentioned above, the PTP message can be initiated by any one of the first and second devices 110A, 110B. Therefore the RTT of the PTP messages may refer to any one described below.

If the PTP is initiated by the second device 110B, the second device 110B is regarded as a master and the first device 110A is regarded as a slave. In the embodiments herein it is assumed that the slave synchronizes its clock to the clock in the master. The term RTT as used herein is a time duration between transmitting a first PTP message from the second device 110B and receiving a second PTP message transmitted by the first device 110A in response to the first PTP message.

Alternatively, if the PTP is initiated by the first device 110A, the first device 110A is regarded as a master, the second device 110B is regarded as a slave. In the embodiments herein it is assumed that the master synchronizes its clock to the clock in the slave. This may happen when the synchronization is performed by both devices, i.e. dual-direction synchronization. In this case, the term RTT refers to a time duration between transmitting a third PTP message by the first device 110A and receiving a fourth PTP message transmitted by the second device 110B in response to the first PTP message.

The first to fourth PTP messages may be any PTP messages mentioned in above. It is known that before transmitting the second or fourth PTP message, a pre-set number of its clock periods, e.g. two clock periods, which is also called "delay in response" D, is imposed. The delay in response refers to a number of clock periods which a device waits for and then responds with a signal for acknowledging a receipt of another signal. The delay in response is known to both the first and second devices 110A, 110B.

A sequence of RTTs means a plurality of successive RTTs which are measured continuously in time. The sequence of RTTs is a finite number of values. The number of RTTs in the sequence and a rate of measuring the RTTs may be configured and defined based on clock frequencies.

If the RTT measurement is repeated by the first device 110A over time, a sequence of RTTs is obtained. The sequence of RTTs may follow a sawtooth wave form. This wave form is due to the clock asynchronization, i.e. synchronization error, between the first device 110A and second device 110B. More details on how such a sawtooth wave form is formed between two devices, can be found in an article, entitled "Joint Ranging and Clock Parameter Estimation by Wireless Round Trip Time Measurements", S. Dwivedi, A. De Angelis, D. Zachariah and P. Händel, IEEE Journal on Selected Areas in Communications, vol. 33, no. 11, pp. 2379-2390, November 2015. This article will be referred to as "Ref 1" hereinafter.

Action A430

The first device 110A estimates a relative clock phase offset, based on the sequence of RTTs of the PTP messages.

The relative clock phase offset is a time difference between a time of arrival of a first arrived PTP message among the PTP messages and a direct subsequent clock cycle. The term first arrived PTP message refers to a PTP message arriving the earliest at the first device 110A, after a time point of measuring the sequence of RTTs started in the action A420. It is known that the "clock period" is a time duration between two adjacent upward edges. Therefore, in other words, the direct subsequent clock cycle refers to an "upward edge" of the direct subsequent clock cycle.

There may be various ways to estimate the relative clock phase offset based on a sequence of RTTs. For instance, according to the Ref 1, the relative clock phase offset together with other parameters may be estimated by using any one of function (8), function (11), and the second function on page 2383, right column.

Action A440

The first device 110A may estimate a clock frequency skew ratio which is the ratio between the frequency of the first clock and the frequency of the second clock. The ratio may be either dividing the frequency of the first clock by the frequency of the second clock, or vice versa.

The first device 110A may estimate the clock frequency skew ratio by using various known procedures.

For instance, according to a conventional procedure, the first device 110A may estimate, in action A441, the clock frequency skew ratio based on timestamps comprised in the PTP messages. To distinguish from other procedures which will be discussed below, the clock frequency skew ratio estimated herein is called a first clock frequency skew ratio.

Alternatively, the first device 110A may estimate the clock frequency skew ratio according to any one of the newly proposed examples herein.

For instance, the first device 110A may estimate, in action A443, the clock frequency skew ratio based on the sequence of RTTs, instead of the timestamps. The action A443 will be described in details below. To distinguish from other procedures discussed in the description, the clock frequency skew ratio estimated herein is called a second clock frequency skew ratio.

For instance, the first device 110A may estimate, in action A445, the clock frequency skew ratio based on the estimated first and second clock frequency skew ratios. This estimated clock frequency skew ratio is called a third clock frequency skew ratio. For instance, the first device 110A may estimate the third clock frequency skew ratio by fusing the first and second clock frequency skew ratios. Fusing herein refers to a process of combining two or more estimates of a parameter from different sources to obtain an improved estimate of that parameter.

Since the clock frequency skew ratio may be obtained according to any one of three possible ways, variations of the above function (1) may be written as follows:

$$C_s(t) = \hat{\alpha}_{PTP} C_m(t) + \beta + \frac{\hat{\phi}}{2\pi f_s} \quad (1')$$

$$C_s(t) = \hat{\alpha}_{RTT} C_m(t) + \beta + \frac{\hat{\phi}}{2\pi f_s} \quad (1'')$$

$$C_s(t) = \hat{\alpha}_{final} C_m(t) + \beta + \frac{\hat{\phi}}{2\pi f_s} \quad (1''')$$

Wherein $\hat{\alpha}_{PTP}$ represents the estimated first clock frequency skew ratio.

$\hat{\alpha}_{RTT}$ represents the estimated second clock frequency skew ratio.

$\hat{\alpha}_{final}$ represents the estimated third clock frequency skew ratio.

Action A450

The first device 110A determines a clock value of the first clock, based on the estimated relative clock phase offset, in order to synchronize the first clock with the second clock.

Determining the clock value of the first clock means to align the upward edges of the first clock with clock edges of the second clock.

The first device 110A may determine the clock value of the first clock further based on the estimated clock frequency skew ratio, if the clock frequency skew ratio was estimated in the above Action 440. For instance, the first device 110A may determine the clock value of the first clock as follows:

$$C_s(t) = \hat{\alpha} C_m(t) + \beta + \frac{\hat{\phi}}{2\pi f_s} \quad (1)$$

Parameters in this function will be described below.

$C_s(t)$ represents a clock value of the first clock at the time point t of performing the determining action A450, i.e., a time point t of the determining. There are several known methods for synchronizing clocks. Embodiments herein may refer to external synchronization which means that some or all devices in the network are synchronized with an external source of time, e.g., a UTC signal. For instance, t may be a time point according to an external source of time.

$\hat{\alpha}$ represents the estimated clock frequency skew ratio, in the action A440, which may be any one of the estimated first to third above clock frequency skew ratios.

$C_m(t)$ represents a clock value of the second clock at the time point t of the determining in the action A450. The clock value of the second clock may be received by the first device 110A in the PTP Sync message.

β represents an initial clock phase offset, which may be obtained by using the conventional PTP protocol. The initial clock phase offset is a time difference between the values of first and second clocks at the time point of starting measuring the sequence of RTTs, in the action A420, minus a propagation time of the first PTP message. The time difference between two clocks may vary over time, and this time difference is called initial clock phase offset herein because it is the time difference at the time point of starting to measure the sequence of RTTs.

$\hat{\phi}$ represents the estimated relative clock phase offset, estimated in the action A430.

$f_s$ represents the frequency of the first clock, as locally stored.

The parameter with a ∧ sign on top means it is an estimated value, instead of an actual value.

Figure 4B:
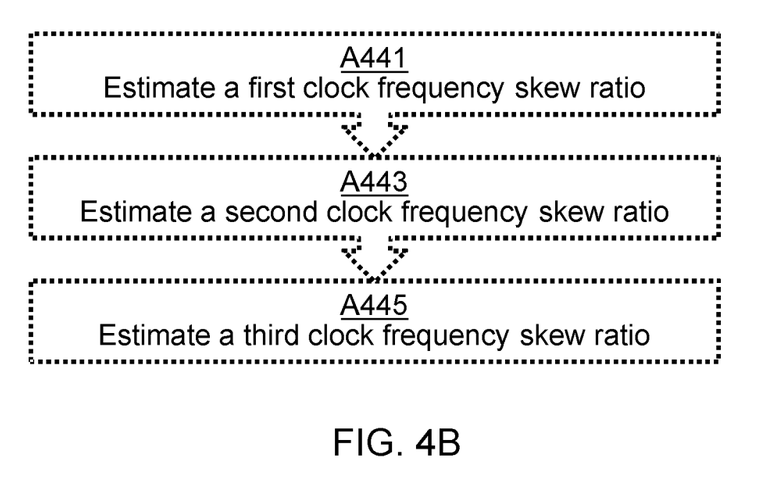

According to some embodiments herein, estimating the second clock frequency skew ratio based on the sequence of RTTs, in the action A443, may be performed by the further actions depicted in FIG. 4B, which actions may be taken in any suitable order.

The first device 110A may estimate a frequency difference based on the sequence of RTTs of the PTP messages. The frequency difference is the difference between the frequency of the first clock and the frequency of the second clock. The frequency difference is an absolute value, i.e., the frequency difference=frequency of the first clock-frequency of the second clock. There may be various ways to estimate the frequency difference based on the sequence of RTTs. For instance, Ref 1 proposes that both the frequency difference and the relative clock phase offset may be estimated by using the function (8) therein.

The first device 110A may estimate the frequency of the second clock based on the frequency difference and the frequency of the first clock. Being aware of the frequency of the first clock which is locally stored and the frequency difference, the first device 110A may estimate the frequency of the second clock by adding or subtracting the frequency difference to/from the locally known frequency of the first clock. For instance, when the frequency of its local clock is lower than the second clock, the addition operation is performed. On the other hand, when the frequency of its local clock is lower than the second clock, the operation of subtraction is performed.

Based on the known frequencies of the first and second clocks, the second clock frequency skew ratio is therefore calculated. Then the first device 110A may estimate the second clock frequency skew ratio between the estimated frequency of the second clock and the frequency of the first clock. As mentioned above, the ratio may be calculated by dividing any one of the two frequencies by the other one.

An exemplary embodiment performed by the first device 110A according to the procedure shown in FIG. 4A-4B, will now be described with further reference to FIG. 3. In this exemplary embodiment, the first device is a slave, the second device is a master.

The second and the first devices exchange PTP messages to gather the timestamps [$t_1$ $t_2$ $t_3$ $t_4$], according to the conventional way as mentioned above. The first device 110A may also estimate the first clock frequency skew ratio $\hat{\alpha}_{PTP}$ and the initial phase offset $\hat{\beta}$ based on the conventional PTP method.

In addition to this, embodiments herein propose also computing the RTT at the first device The computing of the RTT may be repeated at a certain rate. The rate of measuring the RTTs may be associated to the maximum frequency difference between the first and second clocks, thereby allowing efficient estimations of the clock parameters.

A better performance than conventional PTP is achieved by the embodiments herein due to the estimations performed as follows.

Based on the sequence of RTTs, the first device 110A may further estimate the relative clock phase offset $\hat{\varnothing}$, which is not possible to be obtained according to the conventional PTP protocol.

The first device 110A may further estimate the second clock frequency skew ratio $\hat{\alpha}_{RTT}$ as follows:

$$\hat{\alpha}_{RTT} = \left(\frac{f_s - f_d}{f_s}\right) \quad (2)$$

Wherein, $f_d$ is the frequency difference between the two clocks, $f_s$ is the frequency of the first clock, $f_s - f_d$ is, e.g., the frequency of the second clock.

The first device 110A may further estimate the third clock frequency skew ratio $\hat{\alpha}_{final}$ as follows:

$$\hat{\alpha}_{final} = f(\hat{\alpha}_{PTP}, \hat{\alpha}_{RTT}) \quad (3)$$

Wherein, f is a function that fuses the two estimated first and second frequency skew ratios. The third clock frequency skew ratio depends on a covariance matrix of the estimated first clock frequency skew ratio $\hat{\alpha}_{PTP}$ and the estimated second clock frequency skew ratio $\hat{\alpha}_{RTT}$. By doing this, the estimated third clock frequency skew ratio is more precise than any one of the estimated first and second clock frequency skew ratios, since it is based on the two independently estimated ratios, i.e., first and second clock frequency skew ratios.

Then the first device 110A may determine the clock value of the first clock according to any one of the functions (1)-(1''') above.

By taking the relative clock phase offset into account to synchronize the clock, the precision of the synchronization can be improved since the precision of the synchronization is not constrained by the limited granularity of timestamps in the PTP messages. The embodiments and examples described herein can be used for some applications, such as, wireless positioning and ranging systems, distributed antennas and several military applications, requiring a precise synchronization.

Along with PTP messages pass through multiple hops, clock difference accumulates. Thereby an overall synchronization precision of the network may be significantly deteriorated. Due to the precision of the synchronization is improved, the timestamps is also improved at each hop. Thereby an advantage of the embodiments herein is that the accumulated clock difference is restrained and the overall synchronization precision of the network is improved. Moreover a packet delay variation caused by a hardware timestamping unit, which is essential for PTP, is avoided.

Another advantage of the embodiments herein is that, the knowledge of the estimated relative clock phase offset $\hat{\varnothing}$, along with the more precise estimated clock frequency skew ratio $\hat{\alpha}_{final}$ maybe used to determine a clock phase function of the second clock, and thus to predict at the first device 110A a future clock edge of the second clock.

Due to the rate of measuring the RTTs may be variable according to a network load. The proposed procedure also can consider the network load to adapt the signaling cost to the network load or to avoid network signaling overload, while aiming at maintaining an adequate synchronization performance.

The embodiments are implementable with existing ASIC and FPGA technologies. However, the embodiments can also be implemented only in software.

According to some embodiments, the estimated relative clock phase offset may also be used to determine a fraction part of the discrete timestamps. An advantage herein is that a discretization error in estimating the initial clock phase offset β according to the conventional PTP protocol, which is caused by a discrete nature of the timestamps, may be avoided.

Figure 5:
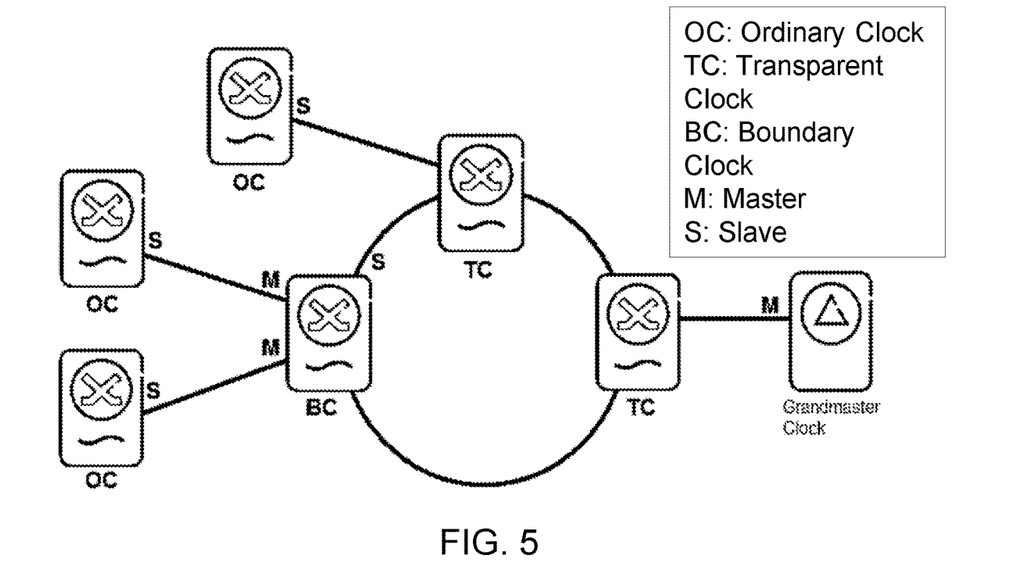
FIG. 5 is an exemplary IEEE 1588v2 network in which the embodiments herein may be applied.

Advantages of the embodiments herein will be further explained in view of different use cases listed below:

1. A performance of the PTP used in packet networks is adversely affected by variable length delays due to queuing of packets, buffering delays of network switches which cumulates with each hop. To reduce the effect of packet delay variations, a typical Institute of Electrical and Electronics Engineers (IEEE) 1588v2 network, as shown in FIG. 5, includes PTP compliant hardware in the form of Boundary Clock (BC) or Transparent Clock (TC) at every intermediate switch. Although the PTP TC/BC may reduce an asynchronization to some extent but nevertheless the asynchronization gets bigger along with each hop. However according to the embodiments herein, the improved precision of synchronization at each hop in the packet network is achieved, thereby allowing more number of hops in the network before the asynchronization exceeds a permissible limit. This results in more flexibility in network design and improved network resource utilization.
2. Taking radio fronthaul network as an example, packet switched interface C2, e.g. Ethernet based interface, is used to connect a Radio Equipment Controller (REC) with a Radio Equipment (RE) instead of traditional interface C1, Common Public Radio Interface (CPRI). A side effect of using the packet switched interface is that the RE can no longer rely on physical connection for the clock information. It means the RE must implement the PTP Boundary Clock (BC) to synchronize itself with a master. However according to the embodiments herein, the improved precision of synchronization is achieved, the physical connection is no longer need for the determining the clock information, therefore sharing of physical connections between RECs and REs is enabled. This will result in more efficient utilization of network resources without losing the precision of synchronization. In a state of art context, the REC may be also termed as baseband unit (BBU) and the RE may be also referred to as an Advanced Antenna System (AAS).
3. In some radio communication network, e.g. a legacy radio fronthaul, the RE's Management Information Base (MIB) shall use the Ethernet based interface to synchronize its local oscillator. However a limited resolution of PTP timestamps and other noise sources from the Ethernet interface limit a highest overall frequency stability. Therefore, the RE is forced to use to expensive Temperature Compensated Crystal Oscillators (TCXOs). However according to the embodiments herein, the improved precision of synchronization is achieved between the REC and the RE by using the packet switched interface, and therefore allow the use of cheaper oscillators on the RE's MIB. Thus, reducing the overall hardware cost of the legacy radio fronthaul.
4. International Telecommunication Union (ITU) G.8275.1 PTP telecom profile for full timing support specifies modes of operation for the exchange of PTP messages to achieve accurate phase/time synchronization. The embodiments herein can be incorporated into the conventional PTP. With the RTT measurements, both the first and second devices are able to independently estimate the relative phase offset in addition to conventional estimations from the PTP, thereby a more precise synchronization is achieved.
5. PTP over Ethernet (ITU G.8265.1) and Synchronous Ethernet (ITU-T G.8261 and ITU-T G.8264) are two standard technologies to synchronize frequency over packet networks in telecommunication environment. The embodiments herein can be incorporated in the afore-mentioned protocols.
6. PTP performance depends on the underlying network condition. With increased traffic load, the packet delay variation can adversely affect the PTP performance. In another embodiment of the invention, in case of a lower traffic load of the network, the first and second devices 110A, 110B may exchange the PTP messages at higher rate compared to higher traffic load. Moreover, the sequence of RTTs may be collected only during the lower traffic load. This allows most accurate RTT measurements and thus better clock parameters estimation. This also avoids influence from the PTP on other network services and procedures
7. Performance of many of the 5G related use cases such as wireless positioning, multi RF-chain synchronization, coordinated multi-point beam forming etc. significantly depends upon an accurate clock synchronization. For instance, in wireless positioning every nano-second loss of precision translates into 30 cms of positioning estimation error. It is already challenging to achieve nanosecond precision with PTP. However according to the embodiments herein, the improved precision of synchronization is achieved. Thanks to the embodiments implementation can be implemented only in software, so the accurate synchronization can be achieved for existing network infrastructure.

Figure 6:
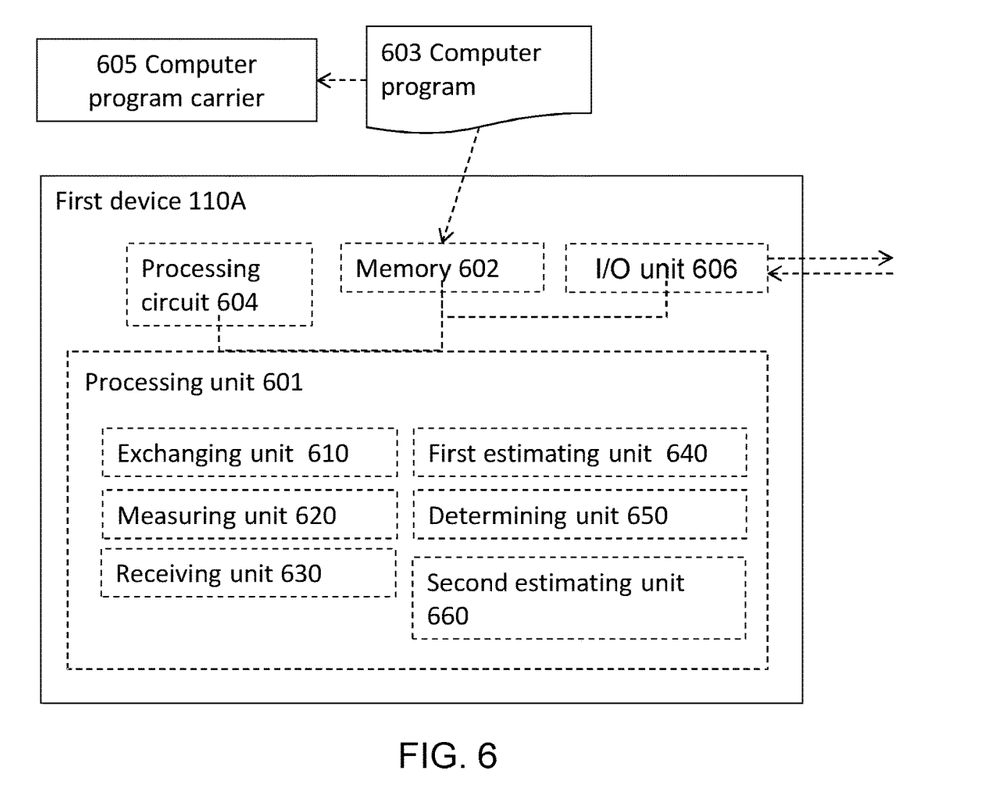
FIG. 6 is a schematic block diagram illustrating embodiments of a first device.

To perform the actions described herein for synchronizing a first clock in the first device 110A with a second clock in a second device 110B, the first device 110A may comprise the following arrangement depicted in FIG. 6.

The first device 110A may be configured to, e.g. by means of an exchanging unit 610, exchange the PTP messages between the first and second devices 110A, 110B.

The first device 110A may be configured to, e.g. by means of a measuring unit 620, measure a sequence of RTTs, when the first device 110A acts as a slave and the 30 second device 110B acts as a master.

The first device 110A may be configured to, e.g. by means of a receiving unit 630, receive the sequence of RTTs from the second device 110B, when the first device 110A acts as a master and the second device 110B acts as a slave.

The first device 110A may be configured to, e.g. by means of a first estimating unit 640, estimate a relative clock phase offset, based on the sequence of RTTs of the PTP messages. The estimated relative clock phase offset is a time difference between a time of arrival of a first arrived PTP message among the PTP messages and a direct subsequent clock cycle.

The first device 110A may be configured to, e.g. by means of a determining unit 650, determine a clock value of the first clock based on the estimated relative clock phase offset, to synchronize the first clock with the second clock.

The first device 110A may be configured to, e.g. by means of the determining unit 650, determine the clock value of the first clock further based on a frequency of the first clock and a frequency of the second clock.

The first device 110A may be configured to, e.g. by means of a second estimating unit 660, estimate a clock frequency skew ratio. The clock frequency skew ratio is between the frequency of the first clock and the frequency of the second clock. Accordingly, the first device 110A may be configured to, e.g. by means of the determining unit 650, determine the clock value of the first clock further based on the estimated clock frequency skew ratio. For instance, the first device 110A may be configured to, e.g. by means of the determining unit 650, determine the clock value of the first clock according to the function (1) as above.

The first device 110A may be configured to, e.g. by means of the second estimating unit 660, estimate the clock frequency skew ratio according to one of the followings: estimate a first clock frequency skew ratio based on timestamps comprised in the PTP messages; estimate a second clock frequency skew ratio based on the sequence of RTTs; and estimate a third clock frequency skew ratio based on the estimated first and second clock frequency skew ratios.

The first device 110A may be configured to, e.g. by means of the second estimating unit 660, estimate the second clock frequency skew ratio as follows:

estimate a frequency difference based on the sequence of RTTs of the PTP messages, wherein the frequency difference is between the frequency of the first clock and the frequency of the second clock;

estimate the frequency of the second clock based on the frequency difference and the frequency of the first clock; and estimate the second clock frequency skew ratio between the estimated frequency of the second clock and the frequency of the first clock.

In some embodiments, the first device 110A may comprise a processor or processing module 601, such as a means for performing the actions described herein which may be realized in the form of one or more hardware modules and/or one or more software modules.

In some embodiments, the processing module 601 may comprise one or more of the units 610-660 as exemplifying hardware modules. In other examples, one or more of the aforementioned exemplifying hardware modules may be implemented as one or more software modules.

The first device 110A may further comprise a memory 602. The memory may comprise, such as contain or store, instructions, e.g. in the form of a computer program 603, which may comprise computer readable code units.

According to some embodiments herein, the first device 110A and/or the processing module 601 comprises a processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the first device 110A is operative to perform the actions according to FIGS. 4A-4B. As another example, the instructions, when executed by the first device 110A and/or the processing circuit 604, may cause the first device 110A to perform the actions according to FIGS. 4A-4B.

FIG. 6 further illustrates a computer program carrier 605, or program carrier, which comprises the computer program 603 as described directly above.

Moreover, the first device 110A may further comprise an Input/Output unit 606.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a first device for synchronizing a first clock in the first device with a second clock in a second device, the method comprising:

estimating a relative clock phase offset, based on a sequence of round trip times (RTTs) of precision time protocol (PTP) messages which are exchanged between the first and second devices, wherein the estimated relative clock phase offset is a time difference between a time of arrival of a first arrived PTP message among the PTP messages and a direct subsequent clock cycle;

estimating a clock frequency skew ratio, the clock frequency skew ratio being between a frequency of the first clock and a frequency of the second clock; and determining a clock value of the first clock, based on the estimated relative clock phase offset, the frequency of the first clock, the frequency of the second clock and the clock frequency skew ratio to synchronize the first clock with the second clock, determining the clock value of the first clock being performed as follows:

$$C_s(t) = \hat{\alpha} C_m(t) + \beta + \frac{\hat{\phi}}{2\pi f_s}$$

$C_s(t)$ representing a clock value of the first clock at the time point t of the determining, $\hat{\alpha}$ $\hat{\alpha}$ representing the estimated clock frequency skew ratio, $C_m(t)$ representing a clock value of the second clock at the time point t of the determining, $\beta$ representing an initial clock phase offset, which is a time difference between the values of the first clock and the second clock at a time point of measuring the sequence of RTTs started minus a propagation time of the first PTP message, $\hat{\phi}$ representing the estimated relative clock phase offset, and $f_s$ representing the frequency of the first clock.

2. The method according to claim 1, wherein estimating the clock frequency skew ratio comprises any one of:

estimating a first clock frequency skew ratio based on timestamps comprised in the PTP messages;

estimating a second clock frequency skew ratio based on the sequence of RTTs;

and estimating a third clock frequency skew ratio based on the estimated first and second clock frequency skew ratios.

3. The method according to claim 2, wherein estimating the second clock frequency skew ratio based on the sequence of RTTs comprises:

estimating a frequency difference based on the sequence of RTTs of the PTP messages, wherein the frequency difference is between the frequency of the first clock and the frequency of the second clock;

estimating the frequency of the second clock based on the frequency difference and the frequency of the first clock; and estimating the second clock frequency skew ratio between the estimated frequency of the second clock and the frequency of the first clock.

4. A first device for synchronizing a first clock in the first device with a second clock in a second device, the first device comprising:

a processing circuit configured to:
estimate a relative clock phase offset, based on a sequence of round trip times (RTTs) of precision time protocol (PTP) messages which are exchanged between the first and second devices, wherein the estimated relative clock phase offset is a time difference between a time of arrival of a first arrived PTP message among the PTP messages and a direct subsequent clock cycle;
estimate a clock frequency skew ratio, the clock frequency skew ratio being between a frequency of the first clock and a frequency of the second clock; and
determine a clock value of the first clock, based on the estimated relative clock phase offset, the frequency of the first clock, the frequency of the second clock, and the estimated clock frequency skew ratio, to synchronize the first clock with the second clock, the clock value of the first clock determined as follows:

$$C_s(t) = \hat{\alpha} C_m(t) + \beta + \frac{\hat{\phi}}{2\pi f_s}$$

$C_s(t)$ representing the clock value of the first clock at the time point t of the determining,
$\hat{\alpha}$ representing the estimated clock frequency skew ratio,
$C_m(t)$ representing a clock value of the second clock at the time point t of the determining,
$\beta$ representing an initial clock phase offset, which is a time difference between the values of first clock and the second clock at a time point of measuring the sequence of RTTs started minus a propagation time of the first PTP message,
$\hat{\phi}$ representing the estimated relative clock phase offset, and
$f_s$ representing the frequency of the first clock.

5. The first device according to claim 4, wherein the processing circuit is configured to estimate the clock frequency skew ratio according to any one of:
estimate a first clock frequency skew ratio based on timestamps comprised in the PTP messages;
estimate a second clock frequency skew ratio based on the sequence of RTTs;
and estimate a third clock frequency skew ratio based on the estimated first and second clock frequency skew ratios.

6. The first device according to claim 5, wherein the processing circuit is further configured to estimate the second clock frequency skew ratio as follows:
estimate a frequency difference based on the sequence of RTTs of the PTP messages, wherein the frequency difference is between the frequency of the first clock and the frequency of the second clock;
estimate the frequency of the second clock based on the frequency difference and the frequency of the first clock; and
estimate the second clock frequency skew ratio between the estimated frequency of the second clock and the frequency of the first clock.

* * * * *